United States Patent [19]

Leatherman

[11] 4,273,702
[45] Jun. 16, 1981

[54] COBALT ALUMINATE INTERNAL COLORANTS FOR DIOL BIS (ALLYL CARBONATE)

[75] Inventor: Ivan R. Leatherman, Wadsworth, Ohio

[73] Assignee: PPG Industries, Inc., Pittsburgh, Pa.

[21] Appl. No.: 118,290

[22] Filed: Feb. 4, 1980

[51] Int. Cl.³ .............................................. C08K 8/22
[52] U.S. Cl. .......................... 260/42.53; 252/188.3 R; 252/300; 260/37 PC
[58] Field of Search ....................... 260/42.53, 37 PC; 252/188.3, 300

[56] References Cited

U.S. PATENT DOCUMENTS

| | | | |
|---|---|---|---|
| 2,403,113 | 7/1946 | Muskat et al. | 260/78 |
| 3,126,958 | 11/1965 | Sheld | 260/23.5 |
| 3,475,339 | 10/1969 | Foster et al. | 252/300 |
| 4,069,168 | 1/1978 | Leatherman et al. | 252/300 |

*Primary Examiner*—Carman J. Seccuro
*Attorney, Agent, or Firm*—Richard M. Goldman

[57] ABSTRACT

Disclosed is a liquid composition of a diol bis (allyl carbonate) monomer and cobalt aluminate where the cobalt aluminate is preferably finely divided and prepared by calcining cobalt oxide and aluminum hydroxide. Also disclosed is a method of polymerizing the liquid composition whereby to obtain a solid blue polymerizate having dispersed therethrough the reaction products of the diol bis (allyl carbonate) and the organic peroxy free radical initiator.

12 Claims, No Drawings

COBALT ALUMINATE INTERNAL COLORANTS FOR DIOL BIS (ALLYL CARBONATE)

DESCRIPTION OF THE INVENTION

This invention relates to colored liquid compositions, polymerizates of the liquid compositions, and methods of preparing the liquids and polymerizates thereof.

Clear plastic polymers are prepared by polymerizing diol bis (allyl carbonates), for example, diethylene glycol bis (allyl carbonate) as well as mixtures thereof with comonomers. The resulting clear, transparent polymers may subsequently be colored, for example, by dip dyeing in heated solutions of organic dyes as surface colorants. The surface colorants so applied cannot be used as internal colorants because they cannot withstand the organic peroxide free radical polymerization initiators. This is evidenced by bubbling, discoloration, haze, cloudiness, nonuniformity of coloration, and even blistering and cracking.

Applicant has found that cobalt aluminate provides an internal colorant that withstands the organic peroxide free radical polymerization initiators.

DETAILED DESCRIPTION OF THE INVENTION

It has now been found that cobalt aluminate may be incorporated in liquid diol bis (allyl glycol carbonate) monomers and solid diol bis (allyl carbonate) polymers in order to produce colored liquids and polymerizates, i.e., lenses, sheets, or plates which are optically clear and substantially free of haze.

In accordance with the practice of the herein described invention, cobalt aluminate may be dissolved or dispersed uniformly in a diol bis (allyl carbonate) monomer solution whereby to provide a colored composition which may then be polymerized to produce polymerizates having uniformly dispersed internal coloration.

By a uniformly dispersed colorant is means that individual colorant particles, if any, are not detectable at less than ten magnification, and that colorant striations or segregation, if any, is not detectable at less than ten magnification.

The cobalt aluminate is preferably prepared by calcining cobalt oxide, CoO and aluminum hydroxide, Al(OH)$_3$. Calcining is preferably carried out above about 650° C. Preferably the cobalt aluminate is finely divided, for example, smaller than 100 mesh. By smaller than 100 mesh it is meant that substantially all of the cobalt aluminate added to the monomer passes a screen having 100 mesh to the inch in each direction. In a particularly preferred exemplification the cobalt aluminate colorant is minus 200 mesh.

While the exact nature of cobalt aluminate in the monomer is not clearly understood, it is believed to exist as a dispersion, with the particles being small enough, and widely enough dispersed to provide uniform coloration. However, there is a concentration, referred to herein as a solubility limit, above which the particles are not uniformly dispersed, and haze is observed. The cobalt aluminate is incorporated in a monomer or monomer mixture at a colorizing level, a colorizing level above which the coloration occurs. This is above about 0.1 percent by weight, basis diol bis (allyl carbonate), up to the solubility limit thereof, i.e., about ¾ weight percent to about 1½ weight percent. At concentration above the solubility limit, haze, cloudiness, and bubbles may be present. While these imperfections may be undesirable in optical uses, they may however, be tolerable in industrial uses, for example, decorative uses or shielding uses.

Monomers which may be used in the practice of this invention are liquid diol bis (allyl carbonate) monomers, for example, diethylene glycol bis (allyl carbonate).

Alternative diol bis (allyl carbonate) compounds include those in which the allyl groups may be substituted at the two position with a halogen, for example, chlorine or bromine, or with a 1 to 4 carbon alkyl group, for example, a methyl or ethyl group, and the diol group may be an alkyl, an alkyl ether, or an alkyl polyether having a total of from 2 to 10 carbons and oxygens. These monomers may be represented by the formula:

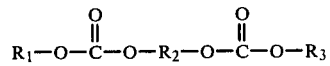

in which $R_1$, $R_3$ are the allyl groups and $R_2$ is the diol group. $R_1$ and $R_3$ may be represented by the formula:

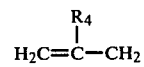

where $R_4$ is a hydrogen, halogen, or a 1 to 4 carbon alkyl group. Specific examples of $R_1$ and $R_3$ include allyl, 2-chloro allyl, 2-bromo allyl, 2-iodo allyl, 2-fluoro allyl, 2-methyl allyl, 2-ethyl allyl, 2-isopropyl allyl, 2-n-propyl allyl, 2-n-butyl allyl groups. These compounds and methods for preparing them are further described in U.S. Pat. Nos. 2,370,567 and 2,403,113.

The diol, $R_2$, may include alkyl groups, such as ethylene groups, trimethylene groups, methylethylene groups, tetramethylene groups, ethylethylene groups, pentamethylene groups, hexamethylene groups, 2-methylhexamethylene groups, octamethylene groups, and decamethylene groups, alkylene ether groups such as —CH$_2$—O—CH$_2$—, —CH$_2$CH$_2$—O—CH$_2$CH$_2$—, —CH$_2$—O—CH$_2$CH$_2$—, and —CH$_2$CH$_2$CH$_2$—O—CH$_2$CH$_2$CH$_2$—, and alkylene polyether groups, such as —CH$_2$CH$_2$O—CH$_2$CH$_2$O—CH$_2$CH$_2$—, and —CH$_2$—O—CH$_2$CH$_2$—O—CH$_2$— groups.

Specific examples of such monomers include ethylene glycol bis (2-chloro allyl carbonate), diethylene glycol bis (2-methyl allyl carbonate), triethylene glycol bis (allyl carbonate), propylene glycol bis (2-ethyl allyl carbonate), 1,3-propane diol bis (allyl carbonate), 1,3-butane diol bis (allyl carbonate), 1,4-butane diol bis (2-bromo allyl carbonate), dipropylene glycol bis (allyl carbonate), trimethylene glycol bis (2-ethyl carbonate), and pentamethylene glycl bis (allyl carbonate). Particularly preferred is diethylene glycol bis (allyl carbonate).

The above enumerated monomers as well as mixtures thereof, containing a colorizing amount of cobalt aluminate may be polymerized in the presence of heat, radiation, or catalysts. Most frequently catalysis is used and the preferred catalysts are organic free radical initiators such as diisopropyl peroxy dicarbonate, di-sec-butyl peroxy dicarbonate, lauryl peroxide, and benzoyl peroxide whereby to yield internally colored polymerizates having desirable hardness, abrasion resistance, and impact resistance.

Other monomers such as vinyl acetate, methyl methacrylate, methyl acrylate, methacrylic acid, and acrylic acid may be included in minor proportions, for example, up to about 25 weight percent, whereby to obtain copolymers, terpolymers, and polymer blends having desired physical properties.

The addition of cobalt aluminate to diol bis (allyl carbonate) monomer required little if any modification in the methods used to effect polymerization thereof.

The monomers are polymerized away from oxygen utilizing an organic peroxide or peroxy carbonate free radical initiation catalyst. The organic peroxide or peroxy carbonate is dissolved in the monomer at a concentration of from about 0.1 to about 10 weight percent, basis weight of the diol bis (allyl carbonate), and typically from about 2 to about 5 weight percent. The catalyzed monomer is then heated to effect the desired degree of polymerization. Temperatures between about 25° C. to 125° C. and reaction times from about 45 minutes to about 36 hours are employed. Heating may be at a constant temperature, at gradually increasing temperatures, or in stepwise increasing temperatures. Heating cycles useful in carrying out the above described polymerization of diol bis (allyl carbonates) are described in the paper by Dial et al, "Polymerization Control in Casting a Thermosetting Resin", *Industrial and Engineering Chemistry*, Vol. 49, at page 2447 (December 1955).

According to one particularly desirable exemplification thereof there is prepared a liquid composition containing the diol bis (allyl carbonate), for example, diethylene glycol bis (allyl carbonate) and cobalt aluminate, for example $-100$ mesh cobalt aluminate prepared by calcining and cobalt oxide and aluminum hydroxide. This liquid composition is polymerized by the addition of a polymerization initiating amount of an organic peroxide free radical polymerization initiator, for example, diisopropyl peroxy dicarbonate, the liquid composition whereby to form a solid polymerizate. The resulting solid polymerizate is a blue, clear polymerizate having dispersed therethrough the reaction products of the diol bis (allyl carbonate), cobalt aluminate, and an organic peroxy free radical initiator.

The following examples illustrate how the present invention may be practiced. Although the examples describe polymerizates of diethylene glycol bis (allyl carbonate), the methods described may be utilized with other diol bis (allyl carbonate) monomers or mixtures thereof.

EXAMPLE I

Cobalt aluminate was dispersed in diethylene glycol bis (allyl carbonate), and the resulting liquid composition was polymerized to yield a blue polymerizate.

Two-tenths gram (0.2 gram) of United Ultramarine and Chemical Co. Cobalt Blue $CoAl_2O_4$, minus 200 mesh, was added to 100 grams of diethylene glycol bis (allyl carbonate). To this liquid composition was added 3.5 grams of benzoyl peroxide initiator. The composition was cured for 24 hours, increasing the temperature from 27° C. to 100° C.

The resulting organic peroxide initiated polymerizate of diethylene glycol bis (allyl carbonate) and cobalt aluminate was blue.

EXAMPLE II

Cobalt aluminate was dispersed in diethylene glycol bis (allyl carbonate), and the resulting liquid composition was polymerized to yield a blue polymerizate.

One tenth gram (0.1 gram) of United Ultramarine and Chemical Co. Cobalt Blue $CoAl_2O_4$, minus 200 mesh, was added to 100 grams of diethylene glycol bis (allyl carbonate). To this liquid composition was added 3.5 grams of diisopropyl peroxy dicarbonate initiator. The composition was cured for 24 hours, increasing the temperature from 27° C. to 100° C.

The result organic peroxide initiated polymerizate of diethylene glycol bis (allyl carbonate) and cobalt aluminate was blue.

While this invention has been described in terms of specific details and embodiments, the description is not intended to limit the invention, the scope of which is as defined in the claims appended hereto.

I claim:
1. A liquid composition comprising diol bis (allyl carbonate) monomer and $CoAl_2O_4$.
2. The liquid composition of claim 1 wherein the monomer is diethylene glycol bis (allyl carbonate).
3. The liquid composition of claim 1 wherein the $CoAl_2O_4$ is minus 100 mesh.
4. The liquid composition of claim 1 wherein the $CoAl_2O_4$ is the calcined reaction product of cobalt oxide and aluminum hydroxide.
5. A solid, blue polymerizate having dispersed therethrough the reaction products of a diol bis (allyl carbonate), $CoAl_2O_4$, and an organic peroxy free radical initiator.
6. The polymerizate of claim 5 wherein the diol bis (allyl carbonate) is diethylene glycol bis (allyl carbonate).
7. The polymerizate of claim 5 wherein the $CoAl_2O_4$ is minus 100 mesh.
8. The polymerizate of claim 5 wherein the $CoAl_2O_4$ is the calcined reaction product of cobalt oxide and aluminum hydroxide.
9. A method of making an internally colored, transparent article, which method comprises:
preparing a liquid composition comprising a diol bis (allyl carbonate) monomer, and a colorizing amount of cobalt aluminate; and
adding a polymerization initiating amount of an organic peroxide free radical polymerization initiator to the liquid composition, whereby to form a solid polymerizate thereof.
10. The method of claim 9 wherein the monomer is diethylene glycol bis (allyl carbonate).
11. The method of claim 9 wherein the cobalt aluminate is minus 100 mesh.
12. The method of claim 9 wherein the $CoAl_2O_4$ is the calcined reaction product of cobalt oxide and aluminum hydroxide.

* * * * *